United States Patent [19]

Patels et al.

[11] 3,718,760

[45] Feb. 27, 1973

[54] SYSTEM FOR REPRODUCING MOTION PICTURES

[75] Inventors: Gottfried Patels; Erich Beck, both of Vienna, Austria

[73] Assignees: Karl Vockenhuber; Raimund Hauser, both of Vienna, Austria

[22] Filed: Oct. 26, 1970

[21] Appl. No.: 83,989

[30] Foreign Application Priority Data

Nov. 21, 1969 Austria........................A 10923/69

[52] U.S. Cl...............178/7.2, 178/7.88, 178/DIG. 28

[51] Int. Cl.................................................H04n 3/00

[58] Field of Search........178/5.4 BD, 6.7 A, 7.2, 7.8, 178/7.85, 7.88, DIG. 29, DIG. 30, DIG. 28; D61/11; 200/61.58, 85 R; 350/52, 159

[56] References Cited

UNITED STATES PATENTS

| | | | |
|---|---|---|---|
| 1,989,317 | 1/1935 | Harper | 178/6.7 A |
| 2,898,831 | 8/1955 | Smith, Jr. et al. | 178/7.2 |
| 2,934,601 | 4/1960 | Oppenheimer | 178/DIG. 30 |
| 3,398,260 | 8/1968 | Martens | 200/85 R |
| 3,333,098 | 7/1967 | Goldmark et al. | 178/6.7 A |
| 2,311,840 | 2/1943 | Holand | 350/159 |
| 2,523,156 | 9/1950 | Somers | 178/DIG. 28 |
| 2,199,608 | 5/1940 | Barthelemy | 178/DIG. 28 |
| 2,407,439 | 9/1946 | Olson | 200/61.62 |
| 2,425,790 | 8/1947 | Fletcher | 200/85 R |
| 2,438,076 | 3/1948 | Stelter | 200/61.58 R |
| 3,062,916 | 11/1962 | Kingsbury et al. | 178/7.2 |
| 2,113,487 | 4/1938 | Von Mihary | 178/DIG. 28 |
| 2,055,748 | 9/1936 | Lubcke | 178/DIG. 28 |

FOREIGN PATENTS OR APPLICATIONS

| | | | |
|---|---|---|---|
| 855,388 | 11/1960 | Great Britain | 178/DIG. 28 |
| 914,387 | 7/1954 | Germany | 178/DIG. 28 |
| 1,182,692 | 12/1964 | Germany | 178/DIG. 28 |

*Primary Examiner*—Robert L. Griffin
*Assistant Examiner*—George G. Stellar
*Attorney*—Ernest G. Montague

[57] ABSTRACT

A television camera comprises a top wall and a camera tube having a light-sensitive surface. A motion picture projector is mounted on said wall and has a projector aperture, means for intermittently moving a film past said projector aperture, and illuminating means for illuminating a portion of said film in register with said projector aperture. Said camera has a telescopic optical system having an entrance opening approximately on the level of said projector aperture and adapted to form on said light-sensitive surface an image of a portion of said film which is illuminated in register with said aperture.

3 Claims, 2 Drawing Figures

Figures 1, 2:
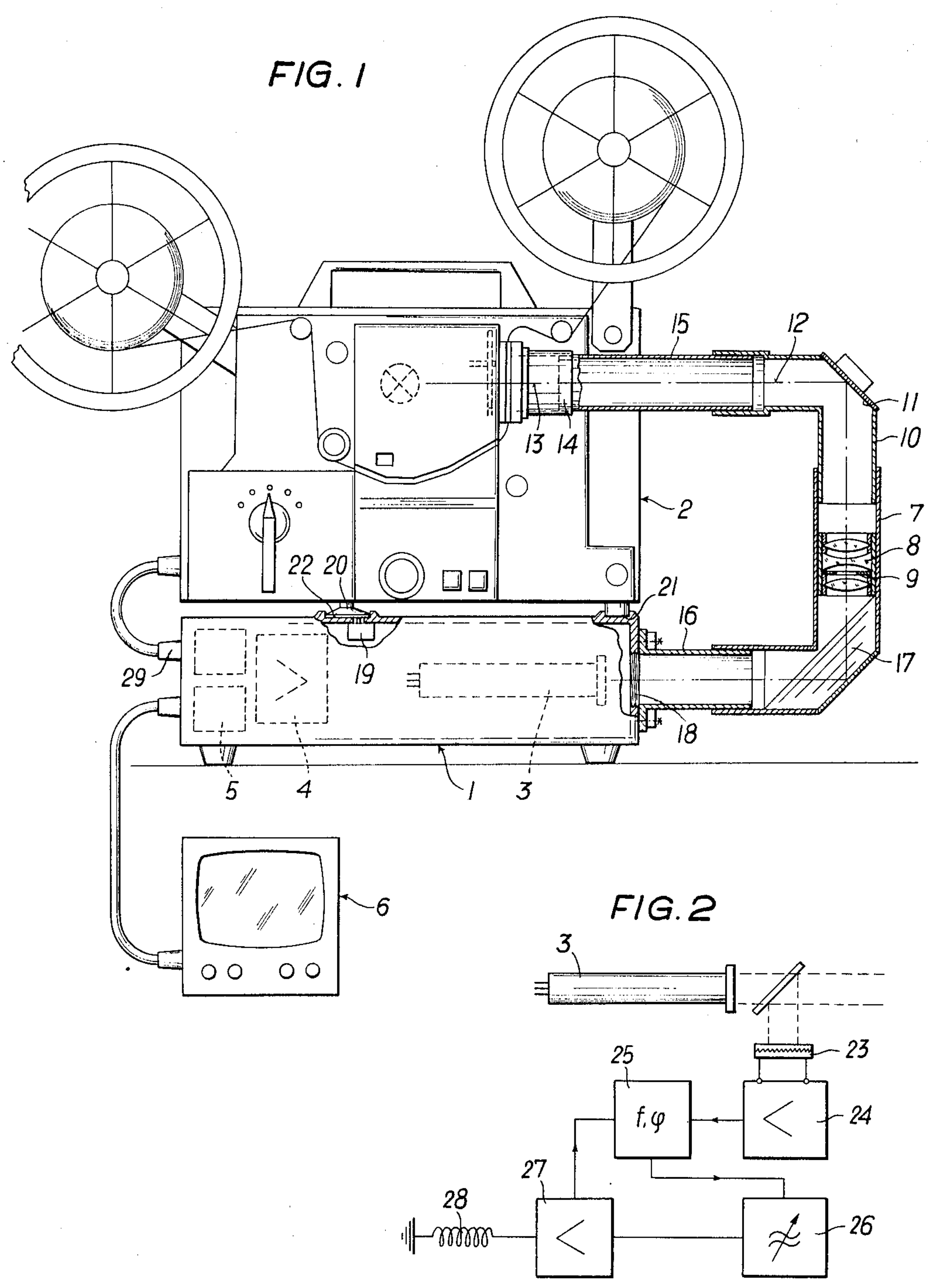

Inventors
Gottfried [illegible]
[illegible]
By [illegible]
Attorney

SYSTEM FOR REPRODUCING MOTION PICTURES

This invention relates to a television camera for a motion picture-reproducing system, which comprises a motion picture projector, preferably for substandard film, and an optical system for forming on the light-sensitive surface of the camera tube an image of a frame of the film which is disposed in the projector aperture and illuminated by an illuminating system of the projector. In known equipment of this kind, the television camera is an integral part of the motion picture-reproducing system so that the application of the television camera and of the motion picture projector are highly restricted.

It is an object of the invention to provide a television camera which may be combined with a commercial motion picture projector to form a motion picture-reproducing system. This will enable the user of the camera to use existing motion picture equipment for the reproduction of motion pictures on the television screen. On the other hand, the motion picture projector should be suitable for a normal presentation of motion pictures. This object is accomplished according to the invention in that the top wall of the television camera constitutes a support for a projector and the optical system of the camera is telescopic and has an entrance opening approximately on the level of the projector aperture of the projector and above the top surface of the housing of the television camera. To enable an adaptation to projectors of different types, the telescopic optical system may be designed according to the invention so as to be adjustable in height above the top surface of the camera. In another embodiment of the invention, the telescopic image-forming system is detachable and the camera is provided in known manner with a mount for standard lenses. When provided with such standard lens, which is connected to the camera by a bayonet or screw-threaded joint, the television camera may be used for all normal televising purposes. To eliminate the need for a synchronization of the motion picture projector, it will be desirable to provide the television camera with external synchronizing means and to provide in the light path of the optical system a photoelectric transducer, such as a photodiode or photoconductor, which delivers pulses in accordance with the bright-dark frequency of the projector, and to supply these pulses to an automatic control circuit for controlling the vertical oscillator of the television camera.

The invention will now be explained more fully with reference to an embodiment shown by way of example on the drawing, in which FIG. 1 is a view showing the novel system in elevation, partly in section.

FIG. 2 is a block circuit diagram representing the means for synchronizing the television camera.

FIG. 1 shows a motion picture-reproducing system comprising a television camera 1 and a motion picture projector 2 for substandard film. The television camera comprises a Vidicon camera tube 3, an amplifier 4, and horizontal and vertical deflection stages 5. The output signal may be supplied directly to a monitor 6, or a high-frequency oscillator may be modulated with the video signal and the output signal of this oscillator may be fed to the television receiver by way of the transmission line leading to the television antenna. The television camera has a telescopic optical system, which comprises a vertical barrel 7, which contains a lens 8 comprising an aperture stop 9. An L-shaped tube 10 is slidably guided in the barrel 7 and contains a redirecting mirror 11. The L-shaped tube 10 can be vertically adjusted in the barrel 7 to a position in which the optical axis 12 of the telescope coincides with the optical axis 13 of the projector. A tube 15 is guided at one end in the lens mount 14 of the projector and at the other end in the tube 10 and shuts off the ambient light so that motion pictures can be reproduced even in bright rooms. The barrel 7 which contains the lens 8 is also L-shaped and provided with a connecting tube 16, which is secured to the camera 1. In the embodiment shown in FIG. 1, a pentagonal prism 17 rather than a normal redirecting mirror is used between the camera tube 3 and the lens 8 and results in the formation of a laterally inverted image on the screen of the camera tube 3. When the screws for fixing the connecting tube 16 have been loosened, the entire optical system can be separated from the camera and a commercial lens may then be inserted into the screw threads 18 provided in the camera so that the camera may then be used for normal televising purposes. The above-mentioned pentagonal prism serves to ensure the formation of right-reading images during the use of the television camera for a reproduction of motion pictures and during a normal use of the television camera.

The above-mentioned embodiment may be modified in that the pentagonal prism 17 is replaced by a planar redirecting mirror. To ensure in that case that a right-reading image will be obtained also during a normal use of the television camera, the polarity of the horizontal deflecting stage can be reversed. In a desirable embodiment of the invention, a switch may be provided for this purpose and may be arranged to be actuated in response to the application of the telescopic optical system or a motion picture projector for substandard film to the housing. FIG. 1 shows such switch 19, which is provided with a push button, which extends through the top plate of the television camera housing and is operated by the base 20 of the projector. To ensure a proper orientation of the motion picture projector 2 for substandard film on the camera housing, the latter is provided in its top surface with recesses 21 and 22 for receiving and locating base portions of the projector.

It is desired to eliminate the appearance of moving black strips on the television screen during a non-synchronous operation of the motion picture projector and the television camera but also to avoid expensive means for synchronizing the motion picture projector for substandard film. For this reason, a desirable embodiment of the invention comprises means for synchronizing the scanning frequency of the television camera in direct response to the operation of the motion picture projector. For this purpose, the redirecting mirror 11 may be semitransparent and succeeded by a photoconductor 23 so that the resistance of this photoconductor varies in accordance with the bright-dark frequency of the projector. The output signal of the photoconductor 23 is amplified in an amplifier 24 (see FIG. 2) and the amplified signal is applied to a phase comparator 25, in which the pulses from the photoconductor are compared in phase to the vertical deflection voltage. Any deviation which may occur will result in a change of the frequency of the vertical deflection oscillator 26. The output signal of the oscillator 26 is amplified by an amplifier 27 and the amplified signal is applied to the deflecting coil 28 of the camera tube 3. The vertical deflection unit is connected to an internal sync generator if the television camera is used separately from a motion picture projector.

It may be desirable to provide for an adjustment of the mirrors 11 and 17 to enable an exact alignment of the image on the camera tube 3. To enable a compensation of the differences in the optical path lengths and an exact adjustment of the image scale which is required, it may be desirable to use a lens 8 consisting of a pancratic lens. Because the light output of the projectors varies within a relatively wide range, gray filters and, if desired, relatively rotatable polarizing filters, if desired, may be included in the optical system. The aperture stop 9 included in the lens 8 may be adjustable if this is desired. The drive means and transformers contained in the projector result in strong magnetic fields near the projector. For this reason, the camera tube 3 is provided with special magnetic shields in order to prevent an adverse effect of the image quality. The television camera 1 has an input plug receptacle 20 for receiving sound signals from a sound projector. The audio-frequency sound signal is superimposed on the video signal in known manner and is reproduced by the television receiver or monitor.

Numerous modifications are possible within the scope of the invention. For instance, pulse-forming stages may be coupled between the phase comparator 25 and the photoconductor 23. Besides, the orientation of the projector 2 on the camera 1 may be different from that shown.

What is claimed is:

1. A television camera comprising
   - a television camera tube having a light sensitive surface,
   - a scanning deflection system comprising deflection reversing means,
   - a housing having a wall, further comprising orientation means disposed on said wall for receiving a film projector,
   - means for transmitting an inverted image from said film projector to said camera tube,
   - sensing means constituting a switch means and having a first and second position, said sensing means being in said first position when orientation means receives said film projector, and said sensing means being in said second position when said film projector is removed from said orientation means, and
   - control circuit means, including said switch means and said deflection reversing means, for controlling the latter by said switch means.

2. An image reproducing system, comprising
   - a television camera comprising a camera tube having a light sensitive surface, a scanning deflection system comprising deflection reversing means, a camera housing having a first wall, first coupling means having sensing means, said first coupling means being arranged on said first wall of said television camera,
   - an optical system comprising an optical system housing, said optical system housing having a second wall, second coupling means for being coupled with said first coupling means and arranged on said second wall, optical means for transmitting an image to said camera tube including image deflection means for said image, and
   - said sensing means constituting switch means having a first and a second position, said sensing means being in said first position when said first coupling means being connected with said second coupling means, and said sensing means being in said second position when said first coupling means being removed from said second coupling means,
   - control circuit means, including said switch means and said deflection reversing means, for reversing the deflection by said switch means in said first position of said sensing means.

3. A system for reproducing film pictures, comprising
   - a television camera, comprising a camera tube having a light sensitive surface, a scanning deflection system for said camera tube and comprising deflection reversing means, and a camera housing having a wall,
   - a film projector comprising a projector housing, connecting means arranged on said projector housing, a film gate, means for guiding a film past said film gate, and illuminating means for illuminating at least a portion of said film in registry with said film gate,
   - a U-shaped telescopic optical system comprising,
     - a substantially vertical central portion and two image reflecting means disposed at opposite ends of said vertical portion,
     - optical means arranged inside said optical system and defining an optical axis, means for aligning said optical axis with said film gate and said camera tube, said optical means for transmitting an image of said film from said film projector to said light sensitive surface,
     - orientation means on said wall of said camera housing for being coupled to said connecting means of said film projector,
     - said orientation means having sensing means constituting a switch means having a first and a second position, said sensing means being in said first position when said connecting means of said film projector being coupled with said orientation means of said camera housing, and said sensing means being in said second position when said connecting means being removed from said orientation means, and
     - control circuit means, including said switch means and said deflection reversing means for reversing the deflection by said switch means in said first position of said sensing means.

* * * * *